United States Patent

Quick

[15] 3,704,576
[45] Dec. 5, 1972

[54] FRUIT AND VEGETABLE HARVESTING DEVICE
[72] Inventor: Graeme R. Quick, Ames, Iowa
[73] Assignee: Iowa State University Research Foundation, Ames, Iowa
[22] Filed: June 9, 1971
[21] Appl. No.: 151,472

Related U.S. Application Data

[63] Continuation-in-part of Ser. No. 753,553, Aug. 19, 1968, Pat. No. 3,596,456.

[52] U.S. Cl. .................................................56/330
[51] Int. Cl. ............................................A01g 19/00
[58] Field of Search........................56/330, 126–130

[56] References Cited

UNITED STATES PATENTS 2,671,301   3/1954   Harrison..................................56/330
3,596,456   8/1971   Quick......................................56/330

Primary Examiner—Louis G. Mancene
Assistant Examiner—J. A. Oliff
Attorney—Zarley, McKee and Thomte

[57] ABSTRACT

A device for harvesting fruit or vegetables including a pickup unit and vibration means for imparting arcuate vibratory motion to the pickup unit for gathering, stripping and conveying the fruit or vegetables to a collecting unit. A sickle bar is positioned below the upper ends of spaced apart teeth provided on the pickup unit for cutting the stems of the plants as the plants move rearwardly through the spaced apart teeth. Cutting action is imparted to the sickle bar by a linkage connecting the oscillating pickup unit, the sickle bar and the frame of the device. An air elevator is provided rearwardly of the spaced apart teeth and sickle bar so that the stems and leafy material which have been separated from the plants can be blow upwardly and rearwardly from the fruit or vegetables as the fruit or vegetables are being conveyed rearwardly to the collection unit.

3 Claims, 5 Drawing Figures

PATENTED DEC 5 1972

3,704,576

INVENTOR
GRAEME R. QUICK
BY
Zarley, McKee & Thomte
ATTORNEYS

FRUIT AND VEGETABLE HARVESTING DEVICE

This application is a continuation-in-part application of the application, Ser. No. 753,553 filed Aug. 19, 1968, now U.S. Pat. No. 3,596,456, Aug. 3, 1971.

In mechanical fruit picking operations, it is necessary that a sufficiently high percentage of the ripe fruit be harvested with a minimum of damage to the fruit. The machine must be able to follow ground irregularities and gather the fruit without becoming clogged with foreign matter. The pickup unit should be sensitive to the size of the fruit and thus pass over those which are too small. This is especially true in the harvesting of strawberries.

The device of the co-pending application has been generally satisfactory but it has been found that crop material sometimes plugs or clogs the teeth when the crop material is being harvested under adverse conditions. Additionally, it was usually necessary for the strawberry crop or the like to be "topped" by a rotary mower to cut off the upper foilage, just above the fruit prior to the harvesting device being used.

A principal object of this invention is to provide a fruit and vegetable harvesting device.

A further object of this invention is to provide a fruit and vegetable harvesting device having a sickle bar assembly mounted on a vibrating pickup unit.

A further object of this invention is to provide a fruit and vegetable harvesting device having a sickle bar assembly mounted on a vibrating pickup unit and means for imparting cutting action to the sickle bar assembly.

A further object of this invention is to provide a fruit and vegetable harvesting device including flexibly mounted teeth on the pickup unit.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

Figure 1:
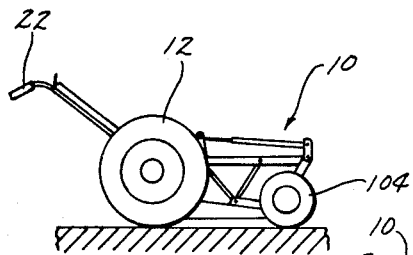
FIG. 1 is a side perspective view of the harvesting device.
Figure 2:
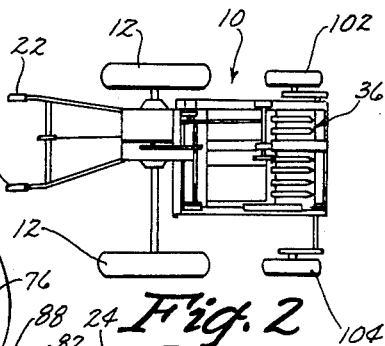
FIG. 2 is a top plan view of the device.

The harvesting device of this invention is generally referred to in FIG. 1 by the reference numeral 10 and includes a pair of large rear drive wheels 12 on an axle 14 connected to a drive gear box 16 in turn powered by an internal combustion engine 18 through a drive mechanism (not shown) extending down through the engine support 20.

A pair of handle members 22 extend rearwardly from the engine support 20 for operation by the operator of the harvesting device. The support 20 is connected at its forward end to the transversely extending cross frame member 23 having forwardly extending side frame members 24 and 24' secured to the opposite ends thereof. The forward ends of side frame members 24 and 24' are interconnected by a forward cross frame member 26.

Figure 3:
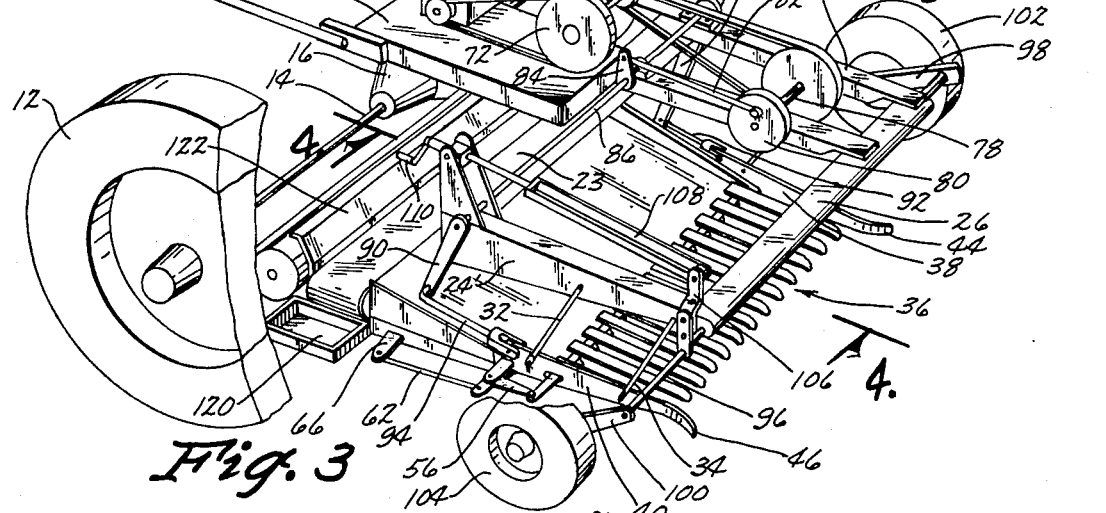
FIG. 3 is a fragmentary perspective view of the harvesting device.
Figure 4:
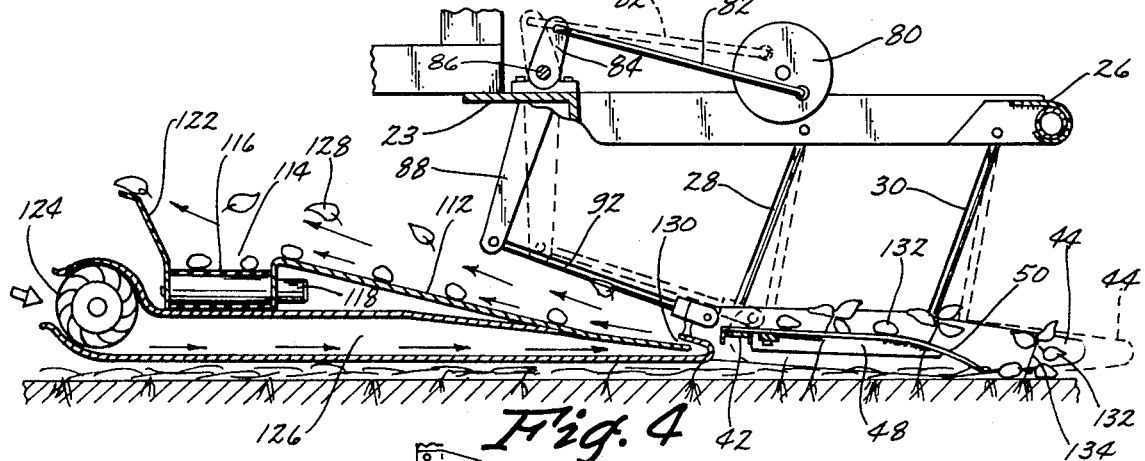
FIG. 4 is a cross-sectional view taken along lines 4—4 of FIG. 3.
Figure 5:
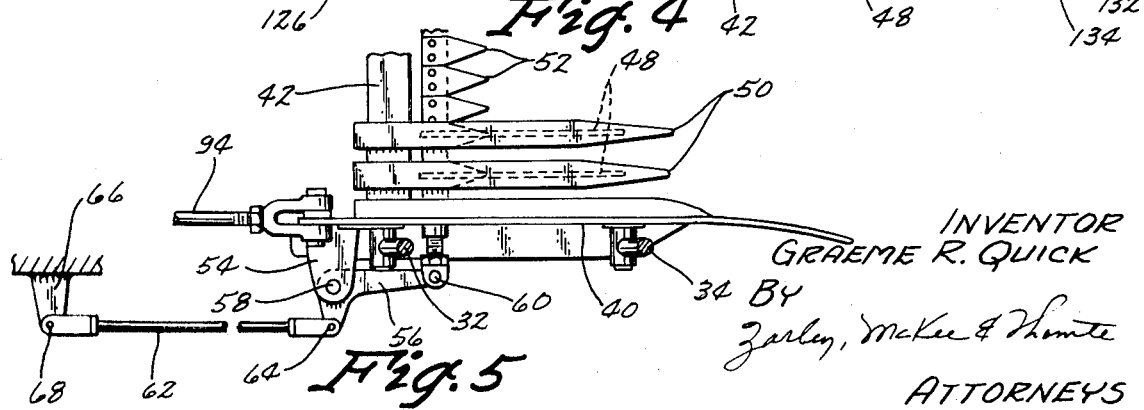
FIG. 5 is a partial top elevational view of the pickup unit and the means connected thereto for operating the sickle bar.

A pair of parallel support rods 28 and 30 are pivotally connected at their upper ends to the frame member 24 and extend downwardly therefrom as illustrated in FIG. 4. A pair of parallel support rods 32 and 34 are pivotally connected at their upper ends to the side frame member 24' and extend downwardly therefrom as seen in FIG. 3. The numeral 36 generally designates a pickup unit comprising generally spaced apart side members 38 and 40 having a frame member 42 secured thereto and extending therebetween adjacent the rearward ends thereof. The forward ends of the side members 38 and 40 are provided with arcuate portions 44 and 46 respectively which function as crop dividers. A plurality of spaced apart supports 48 are welded at their rearward ends to the frame member 42 and extend forwardly therefrom as illustrated in FIG. 5. Teeth 50 are supported on the supports 48 in the manner illustrated in FIGS. 4 and 5. The teeth 50 are positioned on the upper portion of the supports 48 and the forward ends of the supports 48 are welded to the teeth so that the rearward ends of the teeth have lateral flexibility to prevent the jamming of crop material between the teeth. It can be seen in FIG. 4 that the forward ends of the teeth 50 extend downwardly and forwardly at their forward ends.

A sickle or cutter bar 52 is transversely movably mounted on the device with its end portions extending through the side frame members 38 and 40. A bracket 54 is secured to the rearward end of side frame member 40 and has a bell crank 56 pivotally connected thereto about pin 58. One end of bell crank 56 is pivotally connected to the end of sickle 52 at 60. A "lazy link" 62 is pivotally connected to the bell crank 56 at 64 and extends rearwardly therefrom. The rearward end of the "lazy link" 62 is pivotally connected to a fixed bracket 66 at 68. The bracket 66 is secured to the frame means of the device and does not oscillate with the pickup unit.

The vibrating action of the pickup unit 36 is accomplished through a drive belt 70 connected to the engine 18 because it is connected to a pulley 72 on a shaft 74 which drives a belt 76 connected to a shaft 78 which carries an eccentric disc 80. A rod 82 is connected at a point off the rotational axis of the disc 80 and in turn extends rearwardly for pivotal connection to an outstanding post 84 carried on a shaft 86 extending between the side frame members 24 and 24'. At opposite ends of the shaft 86 are downwardly extending arms 88 and 90 respectively which are pivotally connected to rods 92 and 94 respectively which are pivotally connected to the frame members 38 and 40 respectively to provide the vibratory movement for the pickup unit 36.

The cross frame member 26 includes a shaft 96 having downwardly and rearwardly extending wheel support arms 98 and 100 at the opposite ends thereof with depth gauge wheels 102 and 104 carried thereon respectively. The shaft 96 also carries an upstanding post 106 coupled to a screw adjustment means 108 mounted on top of the side frame member 24' as seen in FIG. 3. A hand operated adjustment screw 110 is provided to selectively lower and raise the pickup unit 36 by moving the depth wheels 102 and 104 rearwardly and forwardly respectively.

The numeral 112 refers to a platform which extends upwardly and rearwardly from the rearward end of the teeth 50 and which terminates in a trough 114 having a cross belt conveyor 116 moving therein. A hydraulic motor 118 is provided for driving the belt conveyor 116 so that the fruit is conveyed to a collecting box 120 as seen in FIG. 3. A deflector board 122 extends upwardly and rearwardly from the rearward end of the cross conveyor 116 to prevent the fruit from being blown rearwardly over the cross conveyor belt 116.

A fan 124 is provided rearwardly of the belt conveyor 116 to transmit air through a chamber 126 which nozzles the air at the forward end of the platform 112 adjacent the rear ends of the teeth 50 onto and along the platform 112 rearwardly thereof to provide an air elevator for movement of the fruit rearwardly along with leaves 128 and other foreign material. It is seen that the air passing through the nozzle 130 is of such an intensity that it will blow the fruit onto the cross conveyor 116 and blow the foreign material across the conveyor 116 and thus serve to convey the fruit from the pickup unit 36 to the cross conveyor 116 and clean them at the same time. The bruising of the fruit is minimized by this conveying action.

In operation, the pickup unit 36 is suspended by the four inclined parallel arms 28, 30, 32 and 34 and vibrated in a motion upwardly and rearwardly from the extreme forward position as illustrated by broken lines in FIG. 4 to define an arcuate path of movement. Optimum length of stroke and speed of vibration are on the order of ⅝ inches and 1000 cycles per minute respectively.

It is observed from FIG. 4 that the downwardly projecting ends of the teeth 50 tend to lift the fruit or vegetables 132 on the ground upwardly over the convex surface of the teeth onto the center body portions thereof as the machine advances forwardly. As the plants 132 reach the upper ends of the teeth 50, the sickle bar 52 severs the fruit and a portion of the plant from the main portion of the plant. The sickle bar prevents the plants from jamming between the rearward ends of the teeth 50 and such jamming is also prevented by the flexible characteristics of the teeth 50. It can be appreciated that cutting motion is imparted to the sickle bar 52 due to the arrangement of the structure seen in FIG. 5. Movement of the pickup unit from its rearwardmost to forwardmost position causes the "lazy link" 62 to pivot the bell crank 56 about 58 thereby causing the sickle bar 52 to be transversely moved with respect to the teeth 50. Conversely, movement of the pickup unit 36 from its forwardmost to rearwardmost position causes the bell crank 56 to be pivoted about 58 to move the sickle bar 52 in the reverse direction. Thus, the vibratory motion of the pickup 36 causes the sickle bar 52 to be oscillated so that the blades of the sickle bar will sever the fruit from the plants to prevent the plants from jamming at the rearward ends of the teeth 50.

It is to be understood that this harvesting machine is most effective in operation for harvesting such fruit as strawberries or tomatoes but it may also be used for harvesting other crops including cotton, potatoes, peanuts, capsicum, with minor modifications and therefore the use of the expression fruit or vegetables is not to be considered limiting.

The sickle bar 52 under the rearward ends of the teeth 50 eliminates the preliminary mowing operation which was necessary with the device of the co-pending application. The additional stems and leafy material which are collected on the teeth 50 are subsequently blown up the air elevator and over the back as trash so that it is separated from the fruit. The provision of the sickle under the teeth 50 eliminates the tendency of the crop material to jam between the teeth 50 thereby permitting a higher forward speed, greater capacity, and a better ability to handle less uniform crop ridge shapes.

Thus it can be seen that the device accomplishes at least all of its stated objectives.

I claim:

1. A fruit and harvesting device, comprising,
   a frame having forward and rearward ends with respect to the normal harvesting direction of travel,
   a crop pickup unit at the forward end of said frame and having forward and rearward ends with respect to said normal harvesting direction of travel,
   a fruit collection means on said frame,
   a conveying means for transferring fruit from said pickup unit to said collection means,
   said pickup unit including a plurality of teeth spaced apart transversely of the harvesting direction of travel of said device,
   said pickup unit being movable upwardly and rearwardly from a forward position, with respect to said direction of travel, to define an arcuate path of movement,
   a crop cutting means adjacent the rearward end of said teeth for cutting the crop passing between said teeth adjacent the rearward ends thereof,
   and power means connected to said pickup unit for reciprocating said pickup unit rearwardly and upwardly from said forward position whereby said fruit is lifted, detached from the plant and conveyed rearwardly along said teeth,
   said crop cutting means comprising an elongated, horizontally disposed cutting bar means transversely movably mounted on said pickup unit with respect to the harvesting direction of travel, and linkage means connecting said cutting bar means and said frame, said reciprocating movement of said pickup unit causing said cutting bar means to be transversely reciprocated with respect to said teeth.

2. The device of claim 1 wherein said pickup unit comprises a cross frame member, a plurality of spaced apart supports secured at their rearward ends to said cross frame member and extending forwardly therefrom, said teeth being secured adjacent their forward ends to said supports adjacent the forward ends thereof so that the rearward ends of said teeth may flex laterally to permit crop material to pass therebetween, said cutting bar means being disposed below said teeth adjacent the rearward ends thereof.

3. The device of claim 1 wherein said linkage means comprises an elongated link pivotally connected at one end to said frame, a bell crank means pivotally connected intermediate its ends about a vertical axis to said pickup unit, the other end of said link being pivotally connected to said bell crank means, said bell crank means being operatively connected to one end of said cutting bar means so that said reciprocating movement of said pickup unit causes said link to pivotally move said bell crank means to cause said cutting bar means to be operated.

* * * * *